United States Patent
Anma et al.

(10) Patent No.: US 9,777,826 B2
(45) Date of Patent: Oct. 3, 2017

(54) WORM BIASING STRUCTURE

(71) Applicant: Showa Corporation, Gyoda-shi (JP)

(72) Inventors: Yuusuke Anma, Haga-gun (JP);
Masaru Ishiwata, Haga-gun (JP);
Makoto Watanabe, Haga-gun (JP)

(73) Assignee: SHOWA CORPORATION, Gyoda-Shi (JP)

(*) Notice: Subject to any disclaimer, the term of this patent is extended or adjusted under 35 U.S.C. 154(b) by 322 days.

(21) Appl. No.: 14/575,738

(22) Filed: Dec. 18, 2014

(65) Prior Publication Data
US 2016/0025209 A1   Jan. 28, 2016

(30) Foreign Application Priority Data

Jul. 23, 2014  (JP) .................................. 2014-149677

(51) Int. Cl.
*F16H 57/12* (2006.01)
*B62D 5/04* (2006.01)
(Continued)

(52) U.S. Cl.
CPC ........... *F16H 57/12* (2013.01); *B62D 5/0409* (2013.01); *F16H 57/022* (2013.01); *F16H 2057/02082* (2013.01); *F16H 2057/127* (2013.01)

(58) Field of Classification Search
CPC ................... F16H 57/12; F16H 57/022; F16H 2057/02082; B62D 5/0409
See application file for complete search history.

(56) References Cited

U.S. PATENT DOCUMENTS 4,967,858 A * 11/1990 Kotake ................... B62D 6/10
180/444
6,357,313 B1 * 3/2002 Appleyard ........... B62D 5/0409
384/255
(Continued)

FOREIGN PATENT DOCUMENTS

CN   102530057 A   7/2012
CN   103029747 A   4/2013
(Continued)

OTHER PUBLICATIONS

U.K Search Report mailed Jun. 17, 2015 for the corresponding U.K. Application No. GB1422735.9.
(Continued)

*Primary Examiner* — David M Fenstermacher
(74) *Attorney, Agent, or Firm* — Leason Ellis LLP

(57) ABSTRACT

A worm biasing structure that biases a worm toward a worm wheel in a biasing direction, includes: a radial bearing that supports the worm in a radial direction; a bearing holder that has a holder hole for accommodating the radial bearing; a biasing member for biasing the radial bearing toward the worm wheel; and a housing that has a housing hole for accommodating the bearing holder, a pair of guide surfaces is formed as defined herein, when the bearing holder is accommodated in the housing hole and the radial bearing is not accommodated in the bearing holder, a distance between the pair of guide surfaces is smaller than or equal to an outer diameter of the radial bearing, and a gap is formed between an outer surface on the outer side of the guide surface and the housing hole.

20 Claims, 9 Drawing Sheets

(51) Int. Cl.
*F16H 57/022* (2012.01)
*F16H 57/02* (2012.01)

(56) References Cited

U.S. PATENT DOCUMENTS

| | | | | |
|---|---|---|---|---|
| 2005/0235768 | A1* | 10/2005 | Shimizu | B62D 5/0409 |
| | | | | 74/425 |
| 2012/0111657 | A1 | 5/2012 | Hamakita et al. | |
| 2013/0075189 | A1 | 3/2013 | Sekikawa et al. | |
| 2014/0008142 | A1 | 1/2014 | Yoshikawa et al. | |
| 2015/0276047 | A1* | 10/2015 | Kimijima | F16H 57/12 |
| | | | | 74/409 |
| 2016/0010740 | A1* | 1/2016 | Yamauchi | F16H 55/24 |
| | | | | 74/409 |
| 2016/0069423 | A1* | 3/2016 | Hamakita | B62D 5/0409 |
| | | | | 74/425 |
| 2016/0318544 | A1* | 11/2016 | Kawamura | F16H 57/12 |
| 2016/0319906 | A1* | 11/2016 | Kawamura | F16H 57/12 |

FOREIGN PATENT DOCUMENTS

| | | |
|---|---|---|
| CN | 103442965 A | 12/2013 |
| EP | 2829458 A | 1/2015 |
| JP | 62-122919 U | 8/1987 |
| JP | 2005-231486 A | 9/2005 |
| JP | 2007-270943 A | 10/2007 |
| JP | 2013-208932 A | 10/2013 |

OTHER PUBLICATIONS

Office Action dated Aug. 2, 2017 for the corresponding Chinese Patent Application No. 201410822208.1.

* cited by examiner

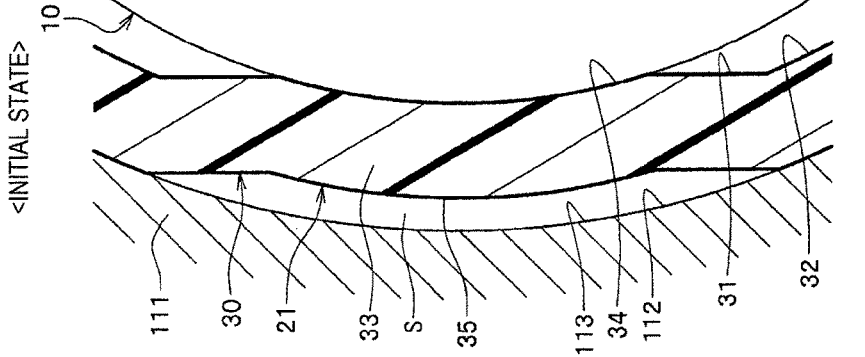
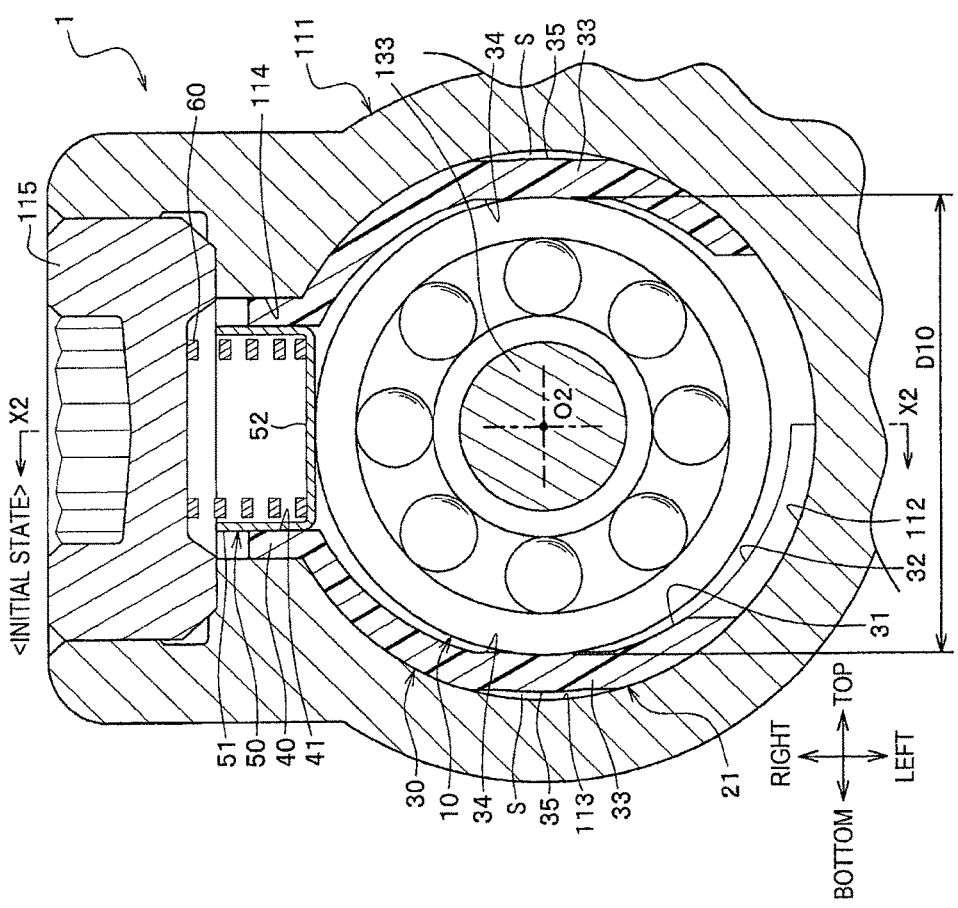

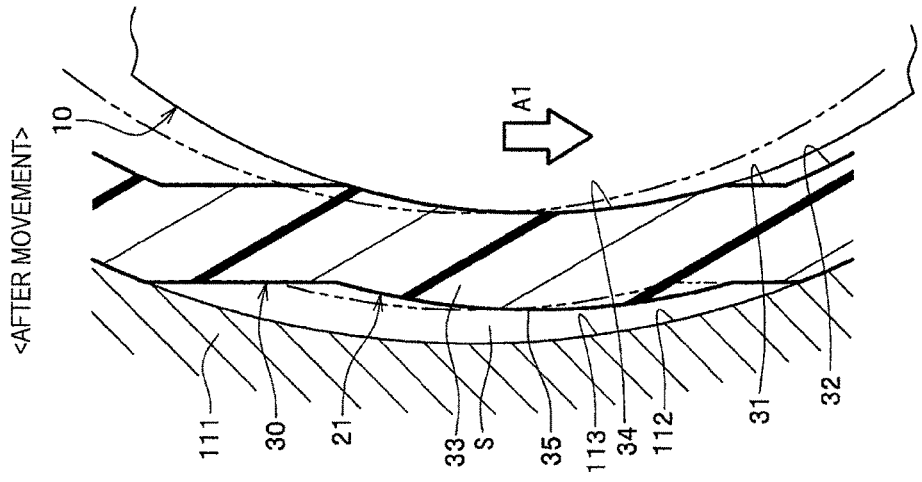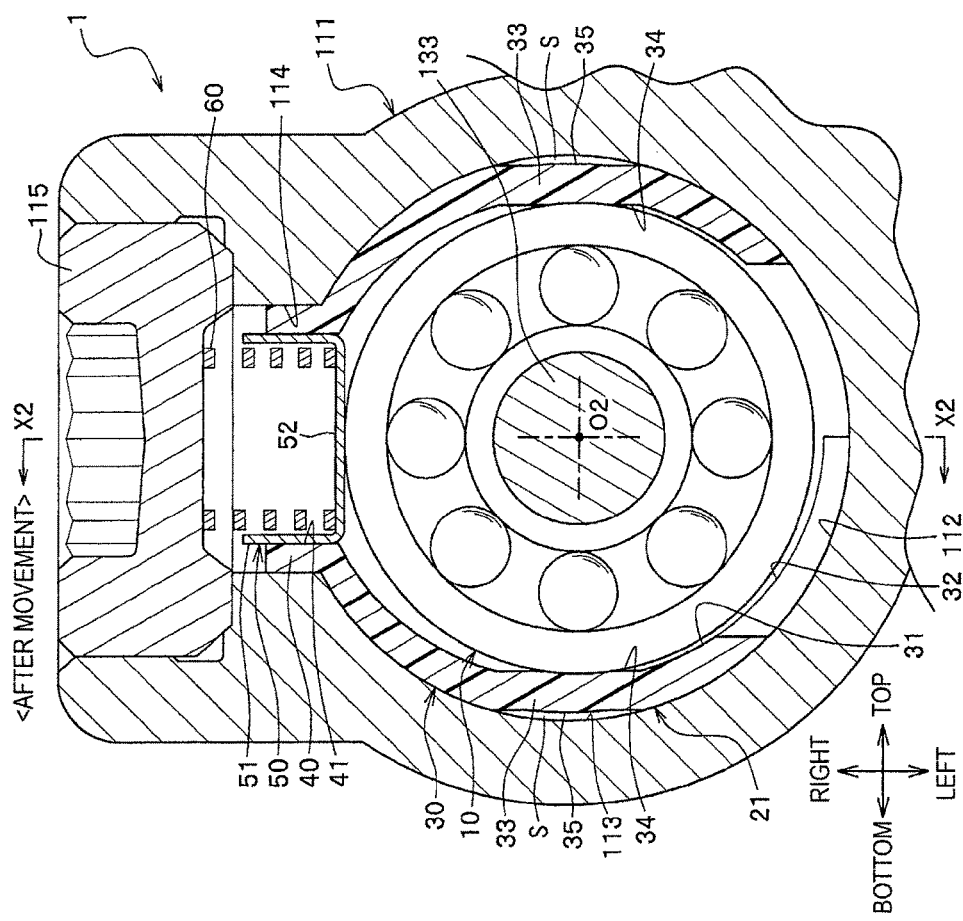

WORM BIASING STRUCTURE

CROSS-REFERENCE TO RELATED APPLICATIONS

This application is based on and claims priority under 35 USC §119 from Japanese Patent Application No. 2014-149677 filed on Jul. 23, 2014, the entire content of which is incorporated herein by reference.

BACKGROUND OF THE INVENTION

1. Field of the Invention

The present invention relates to a worm biasing structure.

2. Description of Related Art

Typically, in a motor-driven power steering apparatus, a rotating force of an auxiliary motor for the generation of an assistance force is transmitted to a pinion shaft and the like via a speed reduction mechanism. For example, the speed reduction mechanism is formed by a worm gear mechanism.

For example, when the motor-driven power steering apparatus is a pinion assistance steering apparatus, the speed reduction mechanism includes a worm (drive gear) connected to an output shaft of the motor, and a worm wheel (driven gear) that meshes with the worm and is fixed to a pinion shaft. In the speed reduction mechanism disclosed in JP-A-2013-208932, a compression coil spring biases the worm toward the worm wheel in a biasing direction (preload direction), and exerts a preload on the worm wheel so as to obtain good meshing of the worm and the worm wheel even though the worm and/or the worm wheel may be worn out, and prevent backlash between the worm and the worm wheel.

Specifically, a resin-made bearing holder accommodates a radial bearing that rotatably supports the worm, and is accommodated in a housing hole of a housing. The bearing holder is split at a location in a circumferential direction of the bearing holder, and has a C shape when seen from an axial direction thereof. A pair of guide surfaces is provided at an inner circumferential surface of the bearing holder so that the radial bearing is interposed, in the direction perpendicular to the biasing direction, between the pair of guide surfaces when the radial bearing is accommodated in the bearing holder. The guide surfaces extend in the biasing direction, and guide the bearing in the biasing direction. That is, the pair of guide surfaces guide the bearing while interposing the bearing therebetween in a perpendicular direction perpendicular to the biasing direction. The C-shaped bearing holder is accommodated in the housing with the diameter of the bearing holder being slightly reduced.

SUMMARY OF THE INVENTION

When a distance W between the pair of guide surfaces is greater than an outer diameter D of the radial bearing (the distance W>the outer diameter D) in a state where the bearing holder is accommodated in the housing, a constant gap (clearance) is formed between the radial bearing and the bearing holder in the perpendicular direction. In that case, there is a problem in that the worm moves in the perpendicular direction and collides with the bearing holder due to an external force input, for example, when a vehicle is travelling on a rough road, thereby generating abnormal noise.

When the distance W between the pair of guide surfaces is smaller than the outer diameter D of the radial bearing (the distance W<the outer diameter D) in a state where the bearing holder is accommodated in the housing, a frictional force increases between the radial bearing and the bearing holder, and the redial bearing has difficulty in sliding in the bearing holder in the biasing direction. In that case, the worm has difficulty in being biased toward the worm wheel.

An object of the present invention is to provide a worm biasing structure that biases a worm in a biasing direction and exerts a preload on the worm, thereby preventing occurrence of abnormal noise.

According to an aspect of the present invention as means for solving the problem, provided is a worm biasing structure that biases a worm toward a worm wheel in a biasing direction. The worm biasing structure includes a radial bearing that supports the worm in a radial direction; a bearing holder that has a holder hole for accommodating the radial bearing; a biasing member for biasing the radial bearing toward the worm wheel; and a housing that has a housing hole for accommodating the bearing holder. A pair of guide surfaces is provided at an inner circumferential surface of the bearing holder surrounding the holder hole so that the radial bearing is interposed between the pair of guide surfaces when the radial bearing is accommodated in the holder hole, and the pair of guide surfaces extends in the biasing direction and guides the radial bearing in the biasing direction. When the bearing holder is accommodated in the housing hole and the radial bearing is not accommodated in the bearing holder, a distance between the pair of guide surfaces is smaller than or equal to an outer diameter of the radial bearing. In the bearing holder, an outer side of the guide surface is thinned so that a gap is formed between an outer surface on the outer side of the guide surface and the housing hole.

In this configuration, since the distance between the pair of guide surfaces is smaller than or equal to the outer diameter of the radial bearing, the radial bearing does not undergo rattling motion in a perpendicular direction perpendicular to the biasing direction, and occurrence of abnormal noise is prevented.

Since in the bearing holder, the outer side of the guide surface is thinned, and the gap is formed between the outer surface on the outer side of each of the guide surfaces and the housing hole, a portion (a guide portion) of the bearing holder is likely to be elastically deformed outwards in the radial direction. Here, the guide portion is a portion in which the guide surface and the outer surface are formed.

Accordingly, when the worm and/or the worm wheel are worn out, a biasing force of the biasing member causes the radial bearing to elastically deform the guide portion and to move toward the worm wheel. Accordingly, the worm is well preloaded, and the worm meshes well with the worm wheel. As a result, backlash does not occur between the worm and the worm wheel.

In the worm biasing structure, when the bearing holder is accommodated in the housing hole and the radial bearing is not accommodated in the bearing holder, the distance between the pair of guide surfaces is preferably smaller than the outer diameter of the radial bearing.

In this configuration, since the distance between the pair of guide surfaces is smaller than the outer diameter of the radial bearing in a state where the bearing holder is accommodated in the housing hole, the radial bearing is further unlikely to undergo rattling motion in the perpendicular direction perpendicular to the biasing direction.

In the worm biasing structure, the outer surface is preferably parallel with the guide surface.

In this configuration, the thickness of the guide portion becomes constant in the perpendicular direction. Accordingly, pressing forces, which are exerted radially outwards in order for the guide portion to be elastically deformed outwards in the radial direction, are substantially equal to each other in the biasing direction. Accordingly, the radial bearing is likely to smoothly move in the biasing direction.

In the bearing holder of the worm biasing structure, the entirety of the outer side of the guide surface is preferably thinned.

In this configuration, since in the bearing holder, the entirety of the outer side of the guide surface is thinned, the guide portion provided with the guide surface is further likely to be elastically deformed. Accordingly, the radial bearing is likely to move in the biasing direction.

In the worm biasing structure, it is preferable that the outer side of each of the guide surfaces on a radially outer side of the bearing holder is thinned so as to form a groove shape extending in an axial direction of the radial bearing so that a rib is formed so as to extend in the axial direction.

In this configuration, it is possible to secure the deformability of the guide portion provided with the guide surface and the outer surface by virtue of a groove-shaped portion (groove) that is thinned in the axial direction, and it is possible to reinforce the guide portion by virtue of the rib extending in the axial direction.

In the worm biasing structure, it is preferable that the outer side of each of the guide surfaces on a radially outer side of the bearing holder is thinned so as to form a groove shape extending in the biasing direction so that a rib is formed so as to extend in the biasing direction.

In this configuration, it is possible to secure the deformability of the guide portion provided with the guide surface and the outer surface by virtue of a groove-shaped portion (groove) that is thinned in the biasing direction, and it is possible to reinforce the guide portion by virtue of the rib extending in the biasing direction.

According to an aspect of the present invention as means for solving the problem, provided is a worm biasing structure that biases a worm toward a worm wheel in a biasing direction. The worm biasing structure includes a radial bearing that supports the worm in a radial direction; a bearing holder that has a holder hole for accommodating the radial bearing; a biasing member for biasing the radial bearing toward the worm wheel; and a housing that has a housing hole for accommodating the bearing holder. A pair of guide surfaces is provided at an inner circumferential surface of the bearing holder surrounding the holder hole so that the radial bearing is interposed between the pair of guide surfaces when the radial bearing is accommodated in the holder hole, and the pair of guide surfaces extends in the biasing direction and guides the radial bearing in the biasing direction. When the bearing holder is accommodated in the housing hole and the radial bearing is not accommodated in the bearing holder, a distance between the pair of guide surfaces is smaller than or equal to an outer diameter of the radial bearing. At an outside of the guide surface, the housing hole is recessed outwards in the radial direction so that a gap is formed between an outer surface on the outer side of the guide surface and the housing hole.

In this configuration, since at the outside of the guide surface, the housing hole is recessed outwards in the radial direction, and the gap is formed between the outer surface on the outer side of the guide surface and the housing hole, a portion (the guide portion) of the bearing holder is likely to be elastically deformed outwards in the radial direction.

Here, the guide portion is a portion in which the guide surface and the outer surface are formed.

Accordingly, when the worm and/or the worm wheel are worn out, a biasing force of the biasing member causes the radial bearing to elastically deform the guide portion and to move toward the worm wheel. Accordingly, the worm is well preloaded, and the worm meshes well with the worm wheel. As a result, backlash does not occur between the worm and the worm wheel.

According to the present invention, it is possible to provide the worm biasing structure that biases the worm in the biasing direction and exerts a preload on the worm, thereby preventing occurrence of abnormal noise.

BRIEF DESCRIPTION OF THE DRAWINGS

FIG. 3A is a cross-sectional view (cross-sectional view taken along line X1-X1 in FIG. 2) of a worm biasing structure in an initial state, and FIG. 3B is an enlarged view.

FIG. 7A is a cross-sectional view of the worm biasing structure after the movement of the bearing holder, and FIG. 7B is an enlarged view.

DETAILED DESCRIPTION OF THE INVENTION

First Embodiment

A first embodiment of the present invention will be described with reference to FIGS. 1 to 7B.

Configuration of Motor-driven Power Steering Apparatus

A motor-driven power steering apparatus 200 is a pinion assistance steering apparatus that inputs an assistance force to a pinion shaft 214. The motor-driven power steering apparatus 200 may be a column assistance steering apparatus or a rack assistance steering apparatus.

Figure 1:
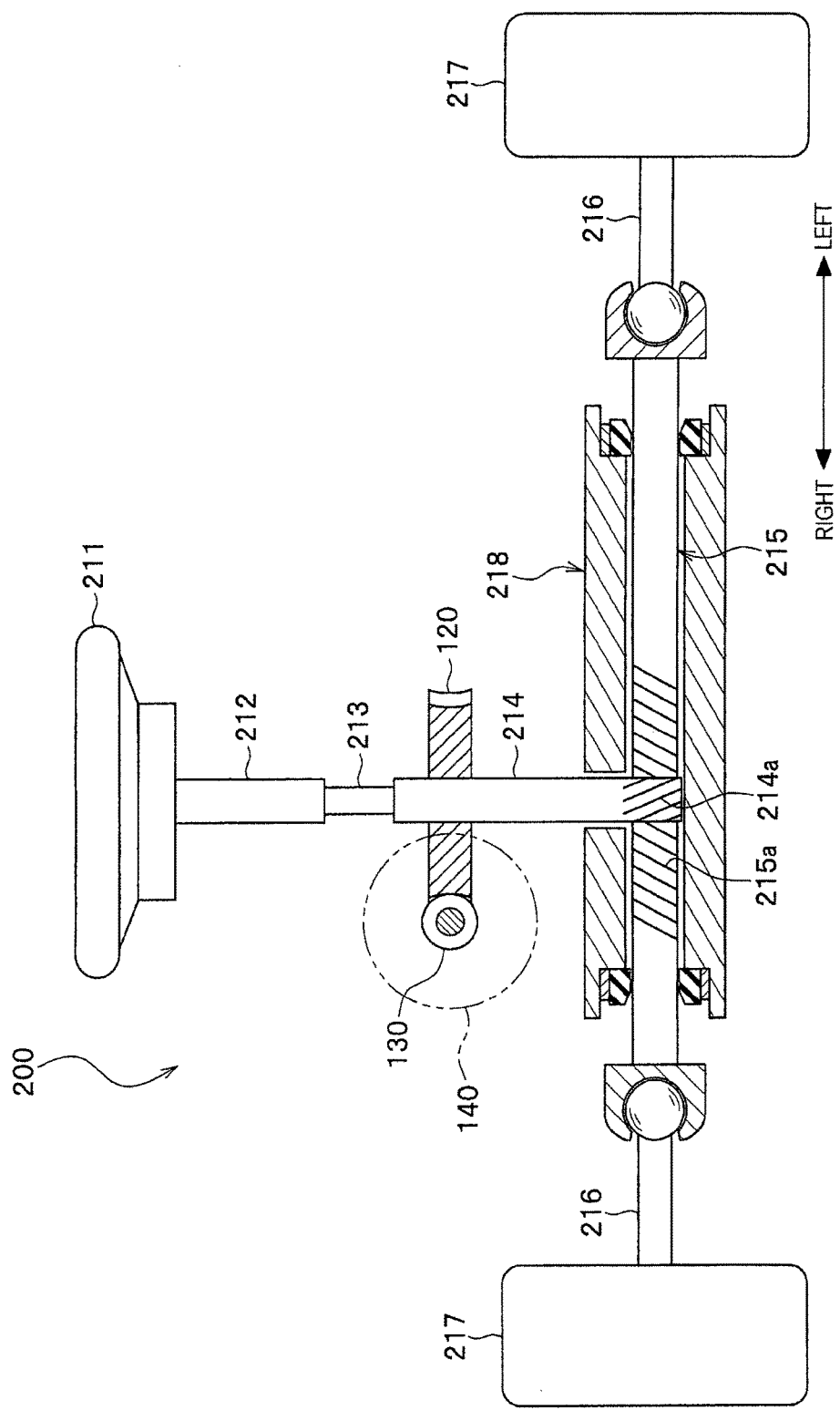
FIG. 1 is a configuration view of a motor-driven power steering apparatus according to a first embodiment.

The motor-driven power steering apparatus 200 includes a steering wheel 211 operated by a driver; a steering shaft 212 that rotates integrally with the steering wheel 211; a torsion bar 213 connected to a lower end of the steering shaft 212; the pinion shaft 214 connected to a lower end of the torsion bar 213; and a rack shaft 215 that extends in a width direction (lateral direction) of the vehicle (direction from left to right or right to left shown in FIG. 1).

Pinion teeth 214a of the pinion shaft 214 mesh with rack teeth 215a of the rack shaft 215. When the pinion shaft 214 rotates about a rotational axis line O1 (refer to FIG. 2), the rack shaft 215 moves in the width direction of the vehicle, and steered wheels (wheels) 217 are turned, the steered wheels 217 being connected to the rack shaft 215 via tie rods 216, respectively. The rack shaft 215 is accommodated in a cylindrical housing 218 via a bush and the like.

Figure 2:
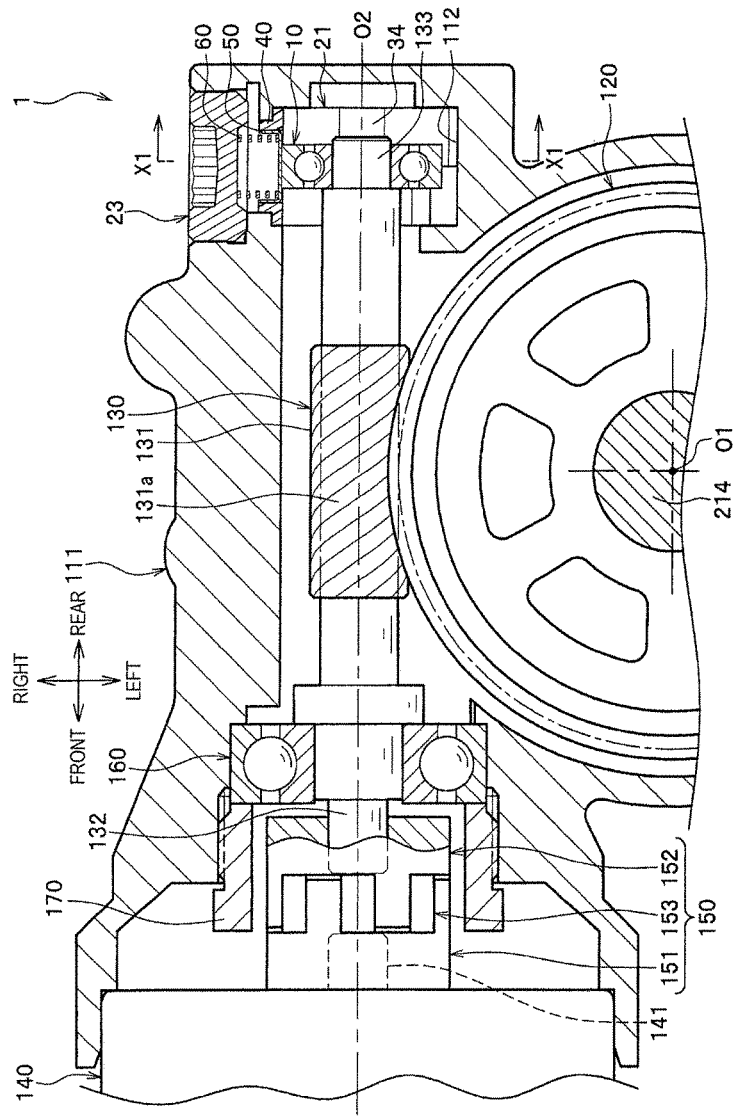
FIG. 2 is a cross-sectional plan view (cross-sectional view taken along line X2-X2 in FIG. 3A) of the motor-driven power steering apparatus according to the first embodiment.

The motor-driven power steering apparatus 200 includes a worm wheel 120 that is coaxially fixed to the pinion shaft 214; a worm 130 that meshes with the worm wheel 120; an electric motor 140 that generates an assistance force and rotates the worm 130; a joint 150 that connects an output shaft 141 of the motor 140 and the worm 130; a housing 111 that accommodates the worm 130 and the like (refer to FIG. 2).

Worm Wheel

The worm wheel 120 is serration-joined to the pinion shaft 214. That is, the worm wheel 120 is attached rotatably and coaxially to the pinion shaft 214.

Worm

The worm 130 is a substantially columnar component that rotates about a rotational axis line O2 (refer to FIG. 2), and includes a worm main body 131, on a circumferential surface of which geared teeth 131*a* are formed; a first shaft journal 132 formed at one end (a side close to the motor 140) of the worm main body 131; and a second shaft journal 133 formed at the other end (an opposite side to the motor 140) of the worm main body 131.

The first shaft journal 132 is rotatably supported by the housing 111 via a first bearing 160. The second shaft journal 133 is rotatably supported by the housing 111 via a second bearing 10 and a bearing holder 21.

When the motor 140 is driven and the worm 130 rotates, the geared teeth 131*a* of the worm 130 ride across wheel teeth formed on an outer circumferential surface of the worm wheel 120. That is, a separation force occurs in the worm 130, thereby causing the worm 130 to separate from the worm wheel 120. For example, when the steering wheel 211 is suddenly operated, and the motor 140 is suddenly driven, a large separation force occurs in the worm 130.

Motor

The motor 140 is an electric motor that is driven in response to a command from an electronic control unit (ECU and not illustrated) and generates an assistance force. The output shaft 141 of the motor 140 is connected to the first shaft journal 132 of the worm 130 via the joint 150. The ECU detects a torsional torque having occurred in the torsion bar 213 via a torque sensor (not illustrated), drives the motor 140 in response to the magnitude of the torsional torque, and generates an assistance force.

Joint

Figure 4:
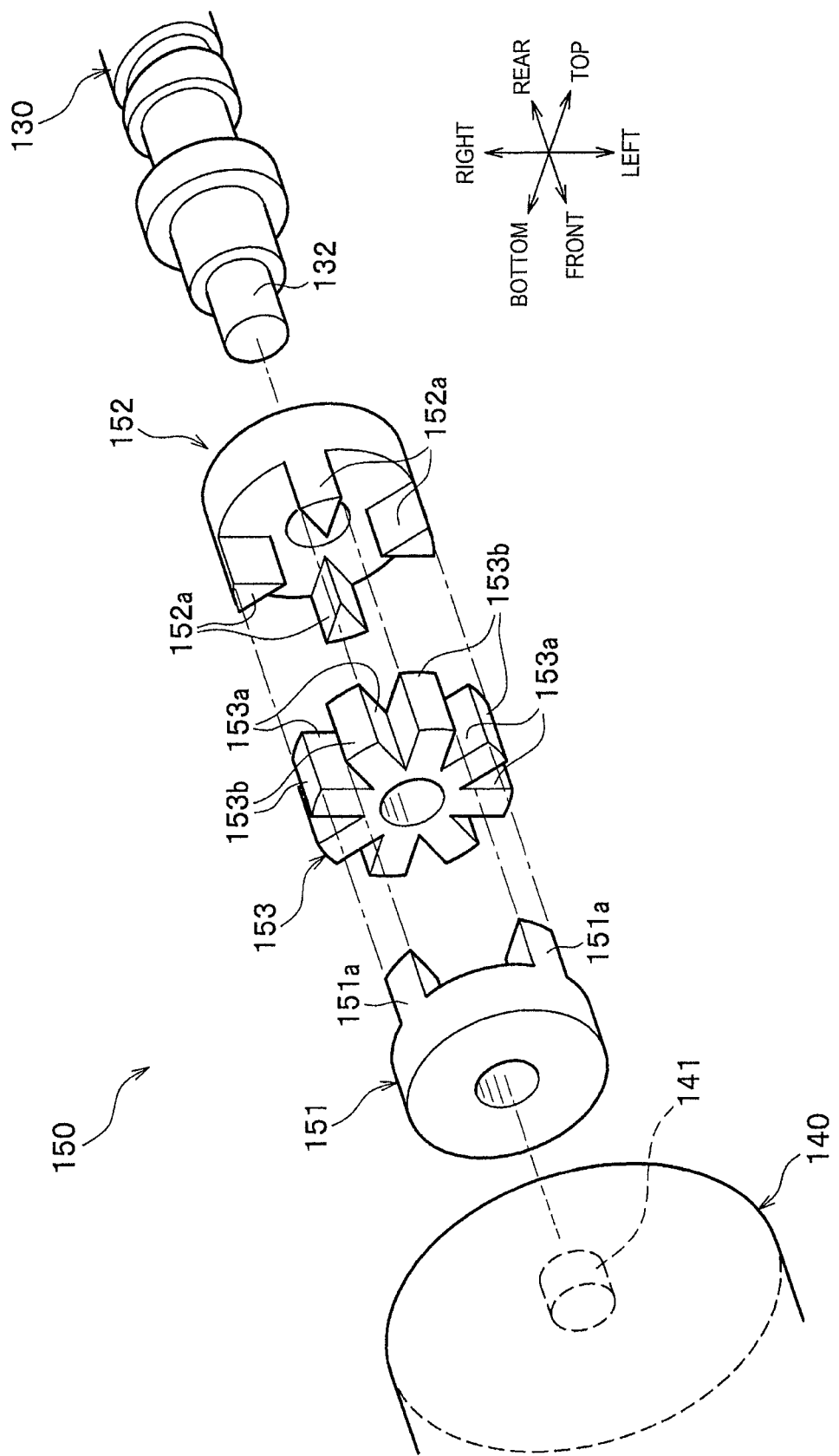
FIG. 4 is an exploded perspective view of a joint according to the first embodiment.

The joint 150 connects the output shaft 141 and the first shaft journal 132, and transmits power of the motor 140 to the worm 130. As illustrated in FIG. 4, the joint 150 includes a first coupling 151 that is rotatably attached to the output shaft 141; a second coupling 152 that is rotatably attached to the first shaft journal 132; and a bush 153 that is interposed between the first coupling 151 and the second coupling 152.

A plurality of (here, four) first engagement claws 151*a* is circumferentially formed at equal intervals in a part of the first coupling 151 adjacent to the bush 153. A plurality of (here, four) second engagement claws 152*a* is circumferentially formed at equal intervals in a part of the second coupling 152 adjacent to the bush 153.

The bush 153 is a component that is formed by an elastic body of rubber or the like, and a plurality of (here, eight) engagement holes 153*a* extends in an axial direction of the bush 153 and are formed on the bush 153 at equal intervals in a circumferential direction thereof. In other words, an engagement claw 153*b* is formed between the engagement holes 153*a* that are adjacent to each other in the circumferential direction.

The plurality of first engagement claws 151*a* and the plurality of second engagement claws 152*a* are alternately fitted into a plurality of the engagement holes 153*a*. Accordingly, a rotating force (power) of the motor 140 is transmitted to the worm 130 via the first coupling 151, the bush 153, and the second coupling 152.

The engagement claws 153*b* made of rubber or the like are respectively interposed between the first engagement claws 151*a* and the second engagement claws 152*a* in the circumferential direction, and the first engagement claws 151*a* are not in direct contact with the second engagement claws 152*a*, respectively, thereby reducing occurrence of tapping noise or rattling in the circumferential direction.

First Bearing

The first bearing 160 is provided between the first shaft journal 132 of the worm 130 and the housing 111, and supports the first shaft journal 132 rotatably with respect to the housing 111. For example, the first bearing 160 is a radial ball bearing, and supports a radial load. The first bearing 160 is held in the housing 111 by a cylindrical retaining member 170 that is screwed into the housing 111.

Housing

The housing 111 accommodates the worm wheel 120, the worm 130, and the like. A housing hole 112 is formed in the housing 111, and accommodates the bearing holder 21 which will be described later. The housing hole 112 has a short columnar shape, and the axial direction of the housing hole 112 extends in an axial direction of the worm 130. Gaps S are formed between an outer surface 35 of a holder main body 30 and an inner circumferential surface 113 that vertically surrounds the housing hole 112. The gaps S have a D shape when seen from a longitudinal direction of the vehicle, and will be described later (refer to FIG. 6).

Figure 6:
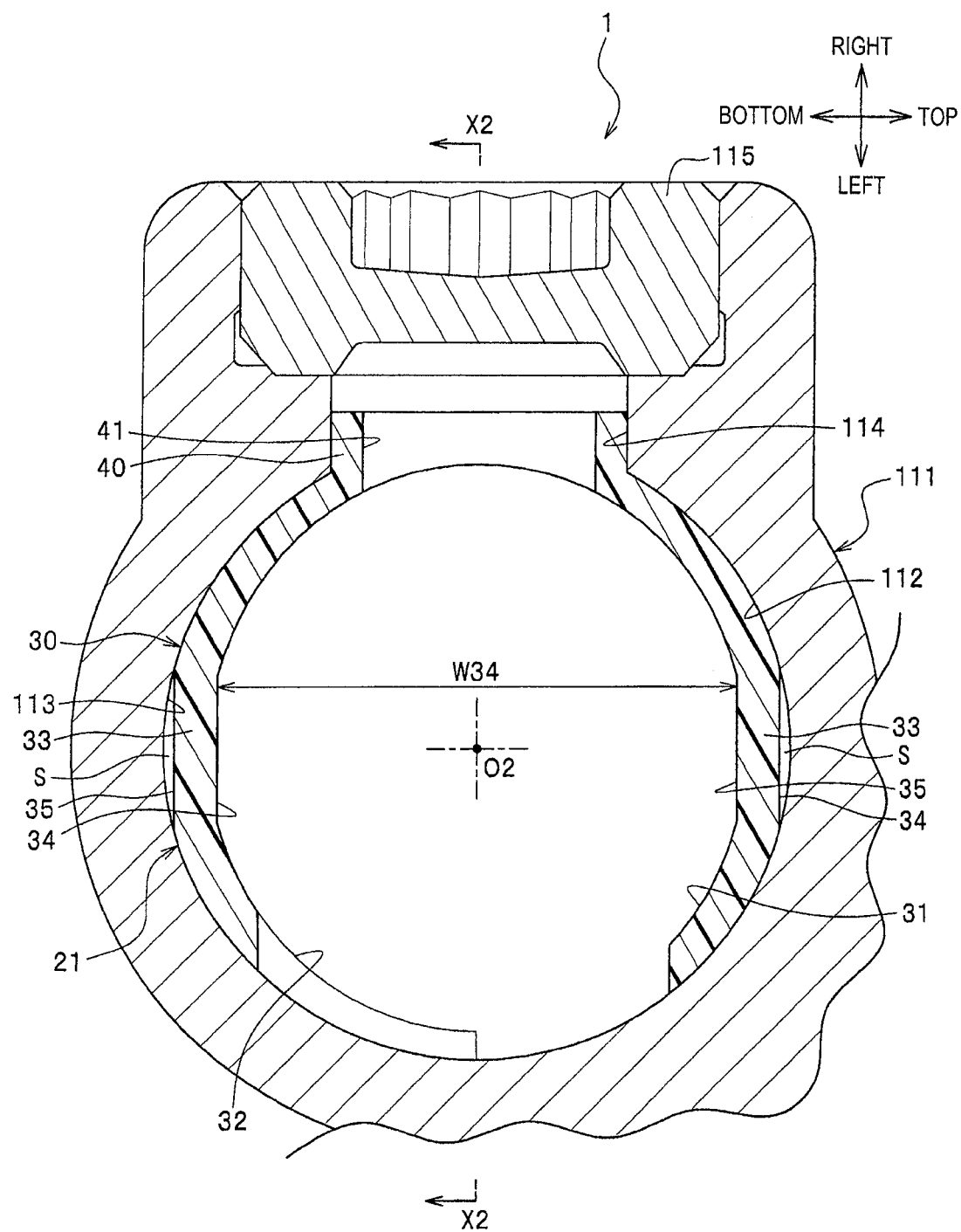
FIG. 6 is a cross-sectional view illustrating a state in which a housing accommodates the bearing holder according to the first embodiment.

The housing hole 112 communicates with the outside via a communication hole 114 that extends in the biasing direction (lateral direction) (direction from left to right or right to left shown in FIG. 6). A cap 115 blocks the communication hole 114, and is screwed into the housing 111.

Worm Biasing Structure

The motor-driven power steering apparatus 200 includes a worm biasing structure 1 that biases a second bearing 10 (the worm 130) toward the worm wheel 120, and exerts a preload on the worm 130. Here, the biasing direction of the second bearing 10 (the worm 130) is the lateral direction in FIG. 3A (direction from left to right or right to left shown in FIG. 3A) (a vertical direction on the drawing sheet of FIG. 3A), and is a radial direction of the worm 130.

As illustrated in FIGS. 2 to 3B, the worm biasing structure 1 includes the second bearing 10; the bearing holder 21; a cup 50; a compression coil spring 60 (biasing member); and the housing 111.

Second Bearing

The second bearing 10 (radial bearing) is provided between the second shaft journal 133 of the worm 130 and the housing 111, and supports the second shaft journal 133 rotatably with respect to the housing 111. For example, the second bearing 10 is a radial ball bearing, and supports a radial preload.

Bearing Holder

Figure 5A:
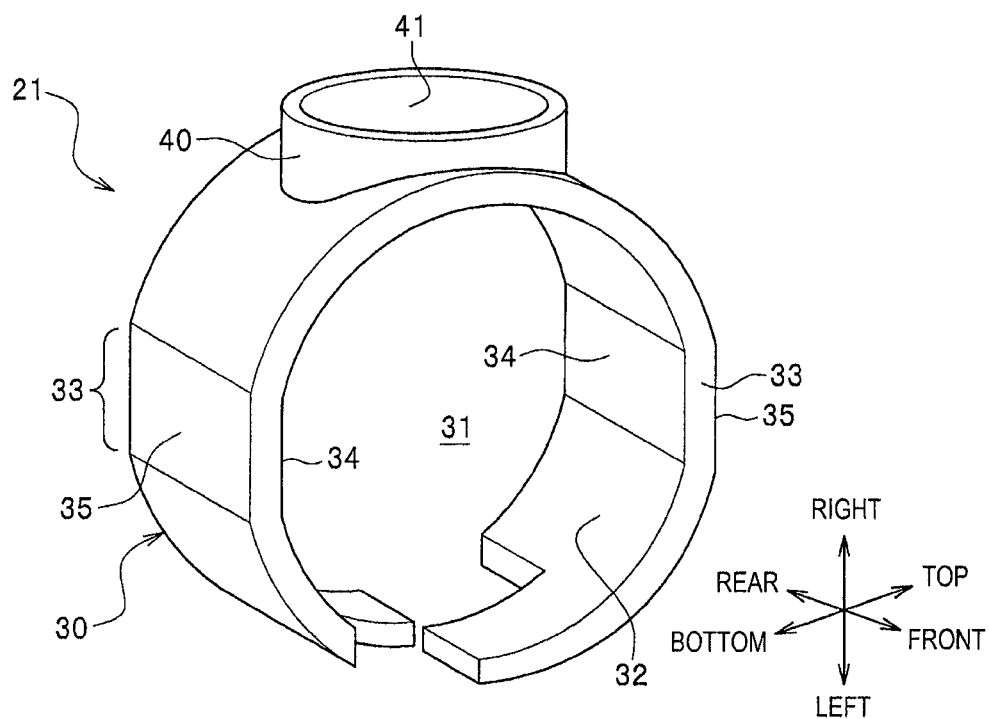
FIG. 5A is a perspective view of a bearing holder according to the first embodiment.
Figure 5B:
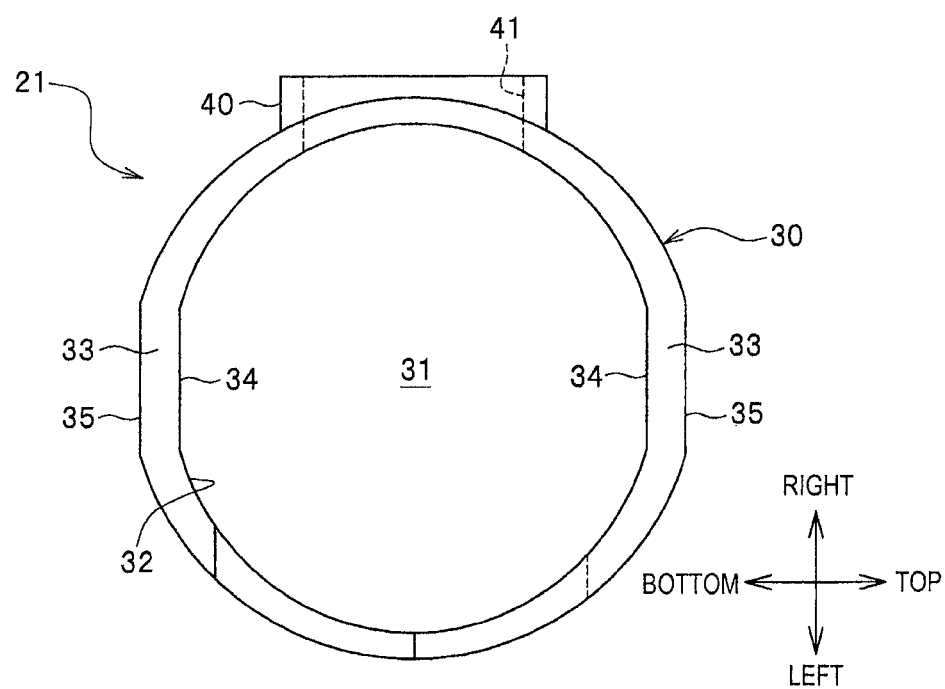
FIG. 5B is a front view.

The bearing holder 21 is a resin-made component that accommodates the second bearing 10 therein and guides the second bearing 10 in the biasing direction. As illustrated in FIGS. 5A and 5B, the bearing holder 21 includes the holder main body 30 and a spring accommodating portion 40.

Bearing Holder-Holder Main Body

The holder main body 30 accommodates the second bearing 10 therein, and guides the second bearing 10 in the biasing direction. The holder main body 30 has a C shape when seen from the axial direction (longitudinal direction). That is, a left side of the holder main body adjacent to the worm wheel 120 is split in the circumferential direction. The C-shaped resin-made holder main body 30 has an elastic force, and the diameter of the holder main body 30 can be reduced. The holder main body 30 is accommodated in the housing hole 112 of the housing 111 while the diameter is slightly reduced.

The holder main body 30 has a holder hole 31 for the accommodation of the second bearing 10 therein. The holder hole 31 is surrounded by an inner circumferential surface 32 of the holder main body 30.

Guide Portion

Opposite portions of the holder main body 30 in the vertical direction (direction of top to bottom or bottom to top shown in FIGS. 5A and 5B) are respectively provided with a pair of guide portions 33, 33 and the guide portions 33, 33 extend in the biasing direction (lateral direction) (direction from left to right or right to left shown in FIGS. 5A and 5B). The pair of guide portions 33, 33 guides the second bearing 10 in the lateral direction (biasing direction).

Guide Portion-Guide Surface

The respective inner surfaces (radially inner surfaces) of the pair of guide portions 33, 33 are respectively provided with a pair of guide surfaces 34, 34, and the guide surfaces 34, 34 extend in the lateral direction (biasing direction). The second bearing 10 is vertically interposed between the pair of guide portions 33, 33, and the pair of guide surfaces 34, 34 is in slide contact with an outer circumferential surface of the second bearing 10. The second bearing 10 is guided in the lateral direction while being in slide contact with the pair of guide surfaces 34, 34. That is, the pair of guide surfaces 34, 34 is provided at the inner circumferential surface 32 so that the second bearing 10 is interposed, in the direction perpendicular to the biasing direction (lateral direction), between the pair of guide surfaces 34, 34. The pair of guide surfaces 34 extends in the biasing direction and guides the second bearing 10 in the biasing direction.

When the bearing holder 21 is accommodated in the housing hole 112, and the second bearing 10 is not installed on the bearing holder 21, a distance W34 between the pair of guide surfaces 34, 34 in the vertical direction (interposing direction) is slightly smaller than an outer diameter D10 of the second bearing 10 (W34<D10, and refer to FIGS. 3A and 6). Accordingly, the second bearing 10 does not undergo rattling motion in the vertical direction (interposing direction).

Guide Portion-Outer Surface

An outer surface (radially outer surface, thinned surface) 35 of each of the guide portions 33 extends in the biasing direction (lateral direction), and the D-shaped gaps S (thinned portions, cut-away portions) are formed between the outer surface 35 and an inner circumferential surface 113 of the housing hole 112. That is, the respective radially outer sides of the guide surfaces 34 are cut into a D shape when seen from the longitudinal direction, and the D-shaped gaps S are formed.

The outer surfaces 35 extend in the biasing direction (lateral direction), and are respectively parallel with the guide surfaces 34. In the guide portions 33, the entireties of the respective radially outer sides of the guide surfaces 34 are thinned, and when seen from the vertical direction, the outer surface 35 is set to have a size greater than or equal to that of the guide surface 34.

As such, since the gaps S are formed on the respective radial outsides of the guide portions 33, when the resin-made guide portions 33 are pressed by the second bearing 10 in the radial direction, a part of the guide portions 33 are elastically deformed and are retracted toward the gaps S, the guide portions 33 being likely to be partially widened in the vertical direction (refer to FIGS. 3B and 7B). Accordingly, the second bearing 10 is well guided in the biasing direction while being in slide contact with the pair of guide portions 33, 33.

Bearing Holder-Spring Accommodating Portion

The spring accommodating portion 40 is a cylindrical portion that extends rightward from a circumferentially intermediate portion of the holder main body 30. The spring accommodating portion 40 accommodates the cup 50 and the compression coil spring 60 therein, and guides the cup 50 and the compression coil spring 60 in the biasing direction. The spring accommodating portion 40 includes an accommodating hole 41 that accommodates the cup 50 and the compression coil spring 60 therein.

Cup

The cup 50 is a member that transmits a biasing force (spring force) of the compression coil spring 60 to the second bearing 10. The cup 50 has a bottomed cylindrical shape, a closed bottom of which is adjacent to the second bearing 10, and is accommodated in the accommodating hole 41 so as to be slideable in the biasing direction. The cup 50 includes a cylindrical circumferential wall portion 51 and a bottom wall portion 52 that is formed in a portion of the circumferential wall portion 51 adjacent to the second bearing 10.

An outer circumferential surface of the circumferential wall portion 51 is in slide contact with an inner circumferential surface of the spring accommodating hole 41, and the circumferential wall portion 51 is guided in the lateral direction. Accordingly, the posture of the cup 50 is well maintained in the lateral direction (biasing direction), and the compression coil spring 60 is not allowed to be bent. As a result, a spring force (biasing force) of the compression coil spring 60 is transmitted to the second bearing 10, and the worm 130 is well biased toward the worm wheel 120.

An outer surface of the bottom wall portion 52 is in line contact with the outer circumferential surface of the second bearing 10. That is, a contact portion between the bottom wall portion 52 and the second bearing 10 extends on an axial line of the second bearing 10. Accordingly, a spring force (biasing force) of the compression coil spring 60 is well transmitted to the second bearing 10 via the bottom wall portion 52.

Compression Coil Spring

The compression coil spring (biasing member) 60 is an elastic body configured by helically winding a wire rod, and is a biasing member that biases the second bearing 10 (the worm 130) toward the worm wheel 120 in the biasing direction (lateral direction). The compression coil spring 60 extends in the accommodating hole 41 in the biasing direction, and is provided in a compressed state between the bottom wall portion 52 and the cap 115. That is, one end of the compression coil spring 60 is in contact with the bottom wall portion 52, and the other end is in contact with the cap 115.

Operational Effects of Worm Biasing Structure

The following operational effects of the worm biasing structure 1 can be obtained.

Since the D-shaped gap S is formed between the outer surface 35 of the guide portion 33 and the inner circumferential surface 113 of the housing 111, when seen from the longitudinal direction, the guide portion 33 is likely to be elastically deformable outwards in the radial direction. Accordingly, when the worm wheel 120 and/or the worm 130 are worn out, a spring force of the compression coil spring 60 causes the second bearing 10 to elastically deform the pair of guide portions 33, 33 and to move leftward.

Accordingly, even though the worm wheel 120 and/or the worm 130 are worn out, the worm 130 supported by the second bearing 10 moves leftward (refer to arrow A1 in FIG. 7B), and the worm 130 meshes well with the worm wheel 120. As a result, backlash does not occur between the worm 130 and the worm wheel 120.

Since the distance W34 between the pair of guide surfaces 34, 34 is smaller than the outer diameter D10 of the second bearing 10 (W34<D10), the second bearing 10 in the bearing holder 21 does not undergo rattling motion in the vertical direction.

Modification Example

The embodiment of the present invention has been described above, but the present invention is not limited to the embodiment, for example, the following modification can be made.

In the configuration of the embodiment, the distance W34 between the pair of guide surfaces 34, 34 is smaller than the outer diameter D10 of the second bearing 10 (W34<D10), but, for example, the distance W34 may be set to be equal to the outer diameter D10 (W34=D10).

In the configuration of the embodiment, the respective outsides of the guide surfaces 34 of the holder main body 30 are thinned, and the D-shaped gaps S are formed between the outer surfaces 35 and the housing hole 112 (the inner circumferential surface 113 (refer to FIG. 6)). However, for example, the housing holes 112 on the respective radial outsides of the guide surfaces 34 are partially recessed outwards in the radial direction, and thus gaps may be formed between the respective circular arc-shaped outer surfaces (parts of the outer circumferential surface of the holder main body 30) on the outer sides of the guide surfaces 34 and the housing hole.

Second Embodiment

Figure 8B:
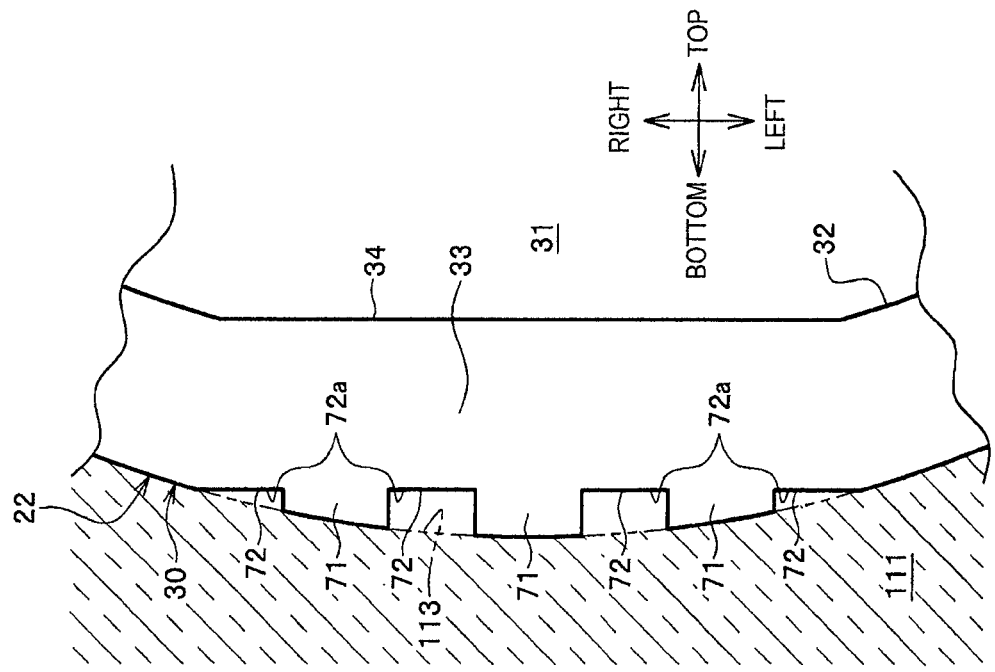
FIG. 8B is a front view.

A second embodiment of the present invention will be described with reference to FIGS. 8A and 8B. The descriptions of points different from the first embodiment will be given.

Figure 8A:
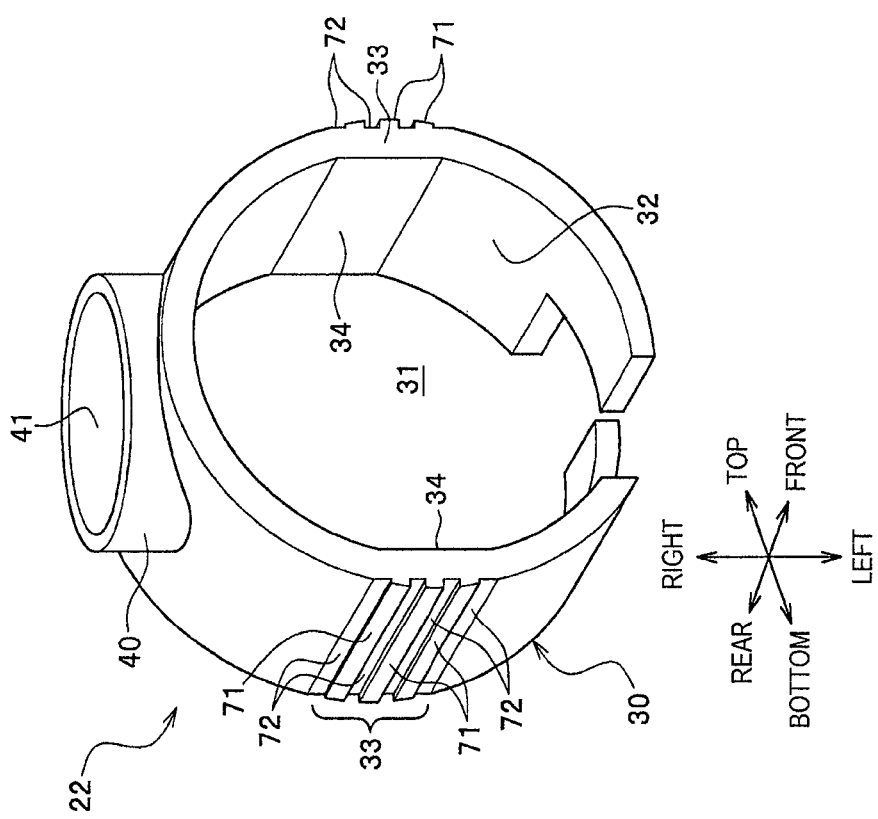
FIG. 8A is a perspective view of a bearing holder according to a second embodiment.

A plurality of ribs 71 is formed on the respective radially outer sides of the guide portions 33 of a bearing holder 22 according to the second embodiment, and extends in the longitudinal direction (axial direction of the second bearing 10) (direction from front to rear or rear to front shown in FIG. 8A). The plurality of ribs 71 is disposed at substantially equal intervals in the lateral direction (direction from left to right or right to left shown in FIGS. 8A and 8B). A radially outer end (vertically outer end) of each of the ribs 71 is in contact with the inner circumferential surface 113 of the housing hole 112.

A groove (thinned portion) 72 is formed between the ribs 71, 71 adjacent to each other in the lateral direction, and extends in the longitudinal direction (axial direction of the second bearing 10). That is, the respective radially outer sides of the guide surfaces 34 are thinned so as to form the grooves 72, each of which has a groove shape extending in the longitudinal direction, and thus the ribs 71 are formed so as to extend in the longitudinal direction. A bottom surface (outer surface) 72a of each of the grooves 72 is parallel with the guide surfaces 34.

Accordingly, in a case where the worm 130 and/or the worm wheel 120 are worn out, and thus the second bearing 10 moves leftward, when a pressing force is exerted radially outwards from the second bearing 10 to each of the guide portions 33, parts of the guide portions 33 are retracted to the grooves 72, the diameter of the guide portions 33 increases, and the distance W34 between the pair of guide surfaces 34, 34 increases. Accordingly, the second bearing 10 and the worm 130 move leftward, and the worm 130 meshes well with the worm wheel 120.

Since the plurality of ribs 71 are formed on the respective radially outer sides of the guide portions 33, the guide portions 33 are not considerably bent outwards in the radial direction. Accordingly, the guide portions 33 are unlikely to be fractured.

Third Embodiment

A third embodiment of the present invention will be described with reference to FIGS. 9A and 9B. The descriptions of points different from the first embodiment will be given.

Figure 9A:
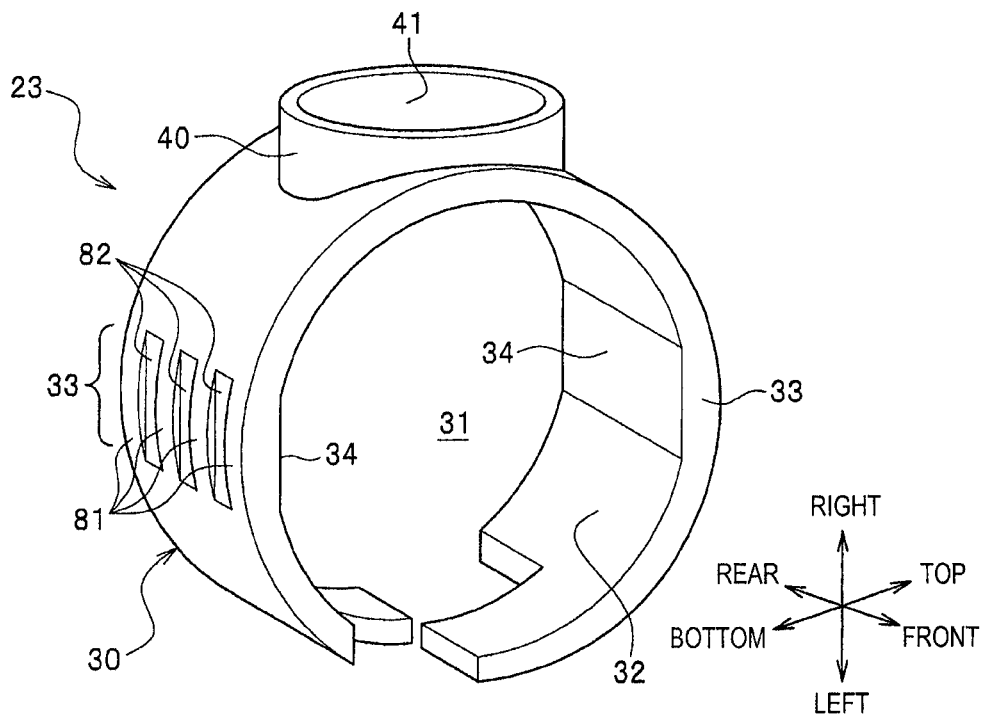
FIG. 9A is a perspective view of a bearing holder according to a third embodiment.
Figure 9B:
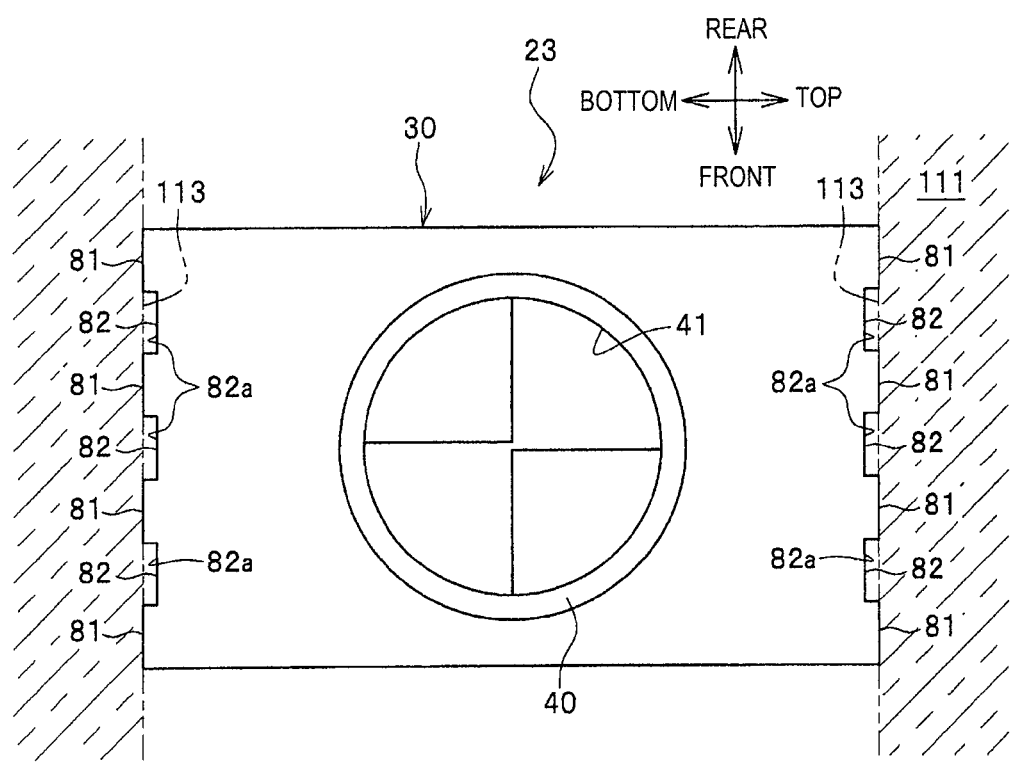
FIG. 9B is a plan view.

A plurality of ribs 81 is formed on the respective radially outer sides of the guide portions 33 of a bearing holder 23 according to the third embodiment, and extends in the lateral direction (biasing direction) (direction from left to right or right to left shown in FIG. 9A). The plurality of ribs 81 is disposed at substantially equal intervals in the longitudinal direction (direction from front to rear or rear to front shown in FIGS. 9A and 9B). A radially outer end (vertically outer end) of each of the ribs 81 is in contact with the inner circumferential surface 113 of the housing hole 112.

A groove (thinned portion) 82 is formed between the ribs 81, 81 adjacent to each other in the longitudinal direction, and extends in the lateral direction (biasing direction). That is, the respective radially outer sides of the guide surfaces 34 are thinned so as to form the grooves 82, each of which has a groove shape in the lateral direction, and thus the ribs 81 are formed so as to extend in the lateral direction. A bottom surface (outer surface) 82a of each of the grooves 82 is parallel with the guide surfaces 34.

Accordingly, in a case where the worm 130 and/or the worm wheel 120 are worn out, and thus the second bearing 10 moves leftward, when a pressing force is exerted radially outwards from the second bearing 10 to each of the guide portions 33, parts of the guide portions 33 are retracted to the grooves 82, the diameter of the guide portions 33 increases, and the distance W34 between the pair of guide surfaces 34, 34 increases. Accordingly, the second bearing 10 and the worm 130 move leftward, and the worm 130 meshes well with the worm wheel 120.

Since the plurality of ribs 81 are formed on the respective radially outer sides of the guide portions 33, the guide portions 33 are not considerably bent outwards in the radial direction. Accordingly, the guide portions 33 are unlikely to be fractured.

What is claimed is:

1. A worm biasing structure that biases a worm toward a worm wheel in a biasing direction, the worm biasing structure comprising:
   a radial bearing that supports the worm in a radial direction;
   a bearing holder that has a holder hole for accommodating the radial bearing;
   a biasing member for biasing the radial bearing toward the worm wheel; and
   a housing that has a housing hole for accommodating the bearing holder,
   wherein a pair of guide surfaces is provided at an inner circumferential surface of the bearing holder surrounding the holder hole so that the radial bearing is interposed between the pair of guide surfaces when the radial bearing is accommodated in the holder hole, and the pair of guide surfaces extends in the biasing direction and guides the radial bearing in the biasing direction, when the bearing holder is accommodated in the housing hole and the radial bearing is not accommodated in the bearing holder, a distance between the pair of guide surfaces is smaller than or equal to an outer diameter of the radial bearing, and in the bearing holder, an outer side of the guide surface includes a cut-away portion so that a gap is formed between an outer surface on the outer side of the guide surface and the housing.

2. The worm biasing structure according to claim 1, wherein when the bearing holder is accommodated in the housing hole and the radial bearing is not accommodated in the bearing holder, the distance between the pair of guide surfaces is smaller than the outer diameter of the radial bearing.

3. The worm biasing structure according to claim 2, wherein the outer surface is parallel with the guide surface.

4. The worm biasing structure according to claim 3, wherein in the bearing holder, the entirety of the outer side of the guide surface is defined by the cut-away portion.

5. The worm biasing structure according to claim 3, wherein the outer side of each of the guide surfaces on a radially outer side of the bearing holder includes the cut-away portion having a groove shape extending in an axial direction of the radial bearing so that a rib is formed so as to extend in the axial direction.

6. The worm biasing structure according to claim 3, wherein the outer side of each of the guide surfaces on a radially outer side of the bearing holder includes the cut-away portion having a groove shape extending in the biasing direction so that a rib is formed so as to extend in the biasing direction.

7. The worm biasing structure according to claim 2, wherein in the bearing holder, the entirety of the outer side of the guide surface is defined by the cut-away portion.

8. The worm biasing structure according to claim 2, wherein the outer side of each of the guide surfaces on a radially outer side of the bearing holder includes the cut-away portion having a groove shape extending in the biasing direction so that a rib is formed so as to extend in the biasing direction.

9. The worm biasing structure according to claim 2, wherein the outer side of each of the guide surfaces on a radially outer side of the bearing holder includes the cut-away portion having groove shape extending in an axial direction of the radial bearing so that a rib is formed so as to extend in the axial direction.

10. The worm biasing structure according to claim 1, wherein the outer surface is parallel with the guide surface.

11. The worm biasing structure according to claim 10, wherein in the bearing holder, the entirety of the outer side of the guide surface is defined by the cut-away portion.

12. The worm biasing structure according to claim 10, wherein the outer side of each of the guide surfaces on a radially outer side of the bearing holder includes the cut-away portion having a groove shape extending in an axial direction of the radial bearing so that a rib is formed so as to extend in the axial direction.

13. The worm biasing structure according to claim 10, wherein the outer side of each of the guide surfaces on a radially outer side of the bearing holder including the cut-away portion having a groove shape extending in the biasing direction so that a rib is formed so as to extend in the biasing direction.

14. The worm biasing structure according to claim 1, wherein the outer side of each of the guide surfaces on a radially outer side of the bearing holder includes the cut-away portion having a groove shape extending in an axial direction of the radial bearing so that a rib is formed so as to extend in the axial direction.

15. The worm biasing structure according to claim 1, wherein in the bearing holder, the entirety of the outer side of the guide surface is defined by the cut-away portion.

16. The worm biasing structure according to claim 1, wherein the outer side of each of the guide surfaces on a radially outer side of the bearing holder includes the cut-away portion having a groove shape extending in the biasing direction so that a rib is formed so as to extend in the biasing direction.

17. The worm biasing structure according to claim 1, wherein the gap has a D-shape when seen from the longitudinal direction.

18. The worm biasing structure according to claim 1, wherein
the bearing holder has a pair of guide portions that guide the radial bearing in the biasing direction, said guide portions containing the pair of the guide surfaces, and
when the guide portions are pressed by the radial bearing in the radial direction, a part of the guide portions is elastically deformed and is retracted toward the gaps so that the radial bearing is guided in the biasing direction while being in slide contact with the guide portions.

19. The worm biasing structure according to claim 1, wherein the biasing member is physically separated from the bearing holder.

20. A worm biasing structure that biases a worm toward a worm wheel in a biasing direction, the worm biasing structure comprising:
a radial bearing that supports the worm in a radial direction;
a bearing holder that has a holder hole for accommodating the radial bearing;
a biasing member for biasing the radial bearing toward the worm wheel; and
a housing that has a housing hole for accommodating the bearing holder,
wherein a pair of guide surfaces is provided at an inner circumferential surface of the bearing holder surrounding the holder hole so that the radial bearing is interposed between the pair of guide surfaces when the radial bearing is accommodated in the holder hole, and the pair of guide surfaces extends in the biasing direction and guides the radial bearing in the biasing direction,
when the bearing holder is accommodated in the housing hole and the radial bearing is not accommodated in the bearing holder, a distance between the pair of guide surfaces is smaller than or equal to an outer diameter of the radial bearing, and
at an outside of the guide surface, an inner surface of the housing is recessed outwards in the radial direction so that a gap is formed between an outer surface on the outer side of the guide surface and the inner surface the housing.

* * * * *